United States Patent [19]

Semon

[11] Patent Number: 4,592,385

[45] Date of Patent: Jun. 3, 1986

[54] VACUUM REGULATOR VALVE

[76] Inventor: Albert L. Semon, 11 Eliot Pl., Short Hills, N.J. 07078

[21] Appl. No.: 721,159

[22] Filed: Apr. 8, 1985

[51] Int. Cl.$^4$ ............................................. G05D 16/06
[52] U.S. Cl. .............................. 137/505.13; 137/505.38; 137/510; 137/907
[58] Field of Search .............. 137/494, 505.13, 505.38, 137/509, 510, DIG. 8

[56] References Cited

U.S. PATENT DOCUMENTS

| | | | |
|---|---|---|---|
| 2,192,042 | 2/1940 | Hoffmann | 137/505.13 X |
| 3,144,011 | 8/1964 | Anthes | 137/505.13 X |
| 3,566,913 | 3/1971 | Parthe | 137/510 X |
| 3,620,244 | 11/1971 | Nisley | 137/505.38 X |
| 3,886,968 | 6/1975 | Murrell | 137/501 |

FOREIGN PATENT DOCUMENTS 957118  5/1964  United Kingdom ......... 137/DIG. 8

Primary Examiner—Robert G. Nilson
Attorney, Agent, or Firm—Clifford G. Frayne

[57] ABSTRACT

An adjustable vacuum regulator valve for the control and adjustment of vacuum and pressure comprising a valve body having an inlet and outlet port, a removably secured threaded cap for the valve body cooperating with the valve body in defining a chamber within the valve body enclosing a flexible diaphragm, an adjustable needle-nose stem valve vertically movably longitudinally disposed within the valve body and having a vertical longitudinal passageway therethrough for communicating between the inlet port and the chamber, a means for communicating between the chamber and the outlet port and a means for securing the adjustable needle-nose stem valve in a fixed position.

1 Claim, 3 Drawing Figures

VACUUM REGULATOR VALVE

FIELD OF INVENTION

This invention relates to valves and more particularly, to an adjustable vacuum regulator valve.

BACKGROUND OF THE INVENTION

Industrial processes utilize an infinite number and variety of valves and many of these processes are concerned, in their operation, with the maintenance of variable pressures and operate at pressures other than atmospheric. There is a need in the industry to be able to accurately control and adjust the pressure in these various industrial processes. A simple adjustable vacuum regulator valve having few moving parts has challenged the industry for some time. The need has existed for such an adjustable vacuum regulator valve in order to adjust for various pressures as required in the various processes and to accurately maintain the pressure or vacuum so desired.

OBJECTS OF THE INVENTION

It is the object of the present invention to provide a novel, adjustable vacuum regulator valve.

A further object of the present invention is to provide a novel, adjustable vacuum regulator valve having few moving parts and easily adjustable to the desired setting for the vacuum.

A still further object of the present invention is to provide for a novel, adjustable vacuum regulator valve which can maintain the desired vacuum and automatically return the system to this desired vacuum.

SUMMARY OF THE INVENTION

These and other objects of the present invention are achieved by an adjustable vacuum regulator valve having a needle-nose stem valve within a valve body, the valve body having an inlet and outlet port, the inlet port to the valve body being in communication through a longitudinal passageway in the needle-nose stem valve with a chamber having a flexible diaphragm, the adjustable needle-nose stem valve being rotatably movable within the valve body to adjust the vacuum in cooperation with the flexible diaphragm and the adjustable needle-nose stem valve having a locking device to secure the adjustable needle-nose stem valve in position in order to set and maintain the desired vacuum.

BRIEF DESCRIPTION OF THE DRAWINGS

A better understanding of the present invention as well as other objects and advantages thereof, will become apparent upon consideration of the detailed disclosure thereof, especially when taken with the accompanying drawings, wherein.

DETAILED DESCRIPTION OF THE INVENTION

Figure 1:
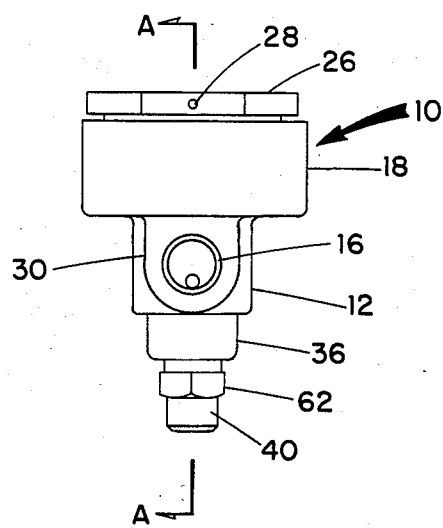
FIG. 1 a side elevational view of the present invention.
Figure 2:
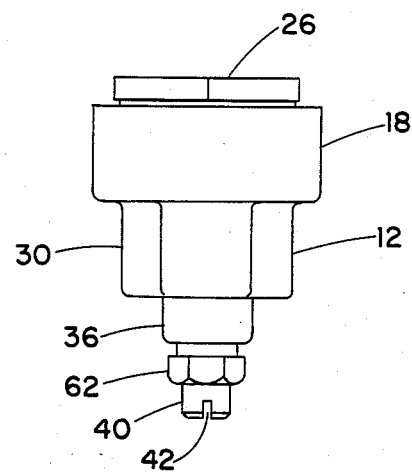
FIG. 2 is a front elevational view of the present invention.
Figure 3:
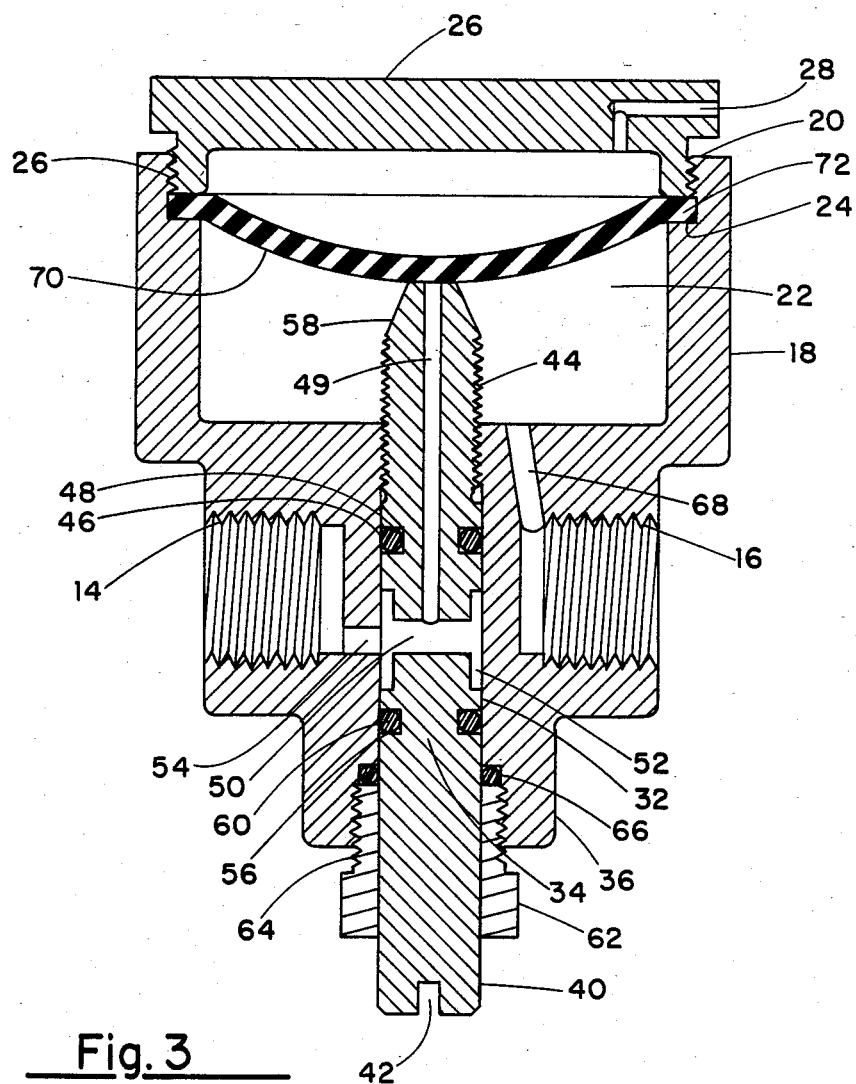
FIG. 3 is a front cross sectional view of the present invention along axis A—A of FIG. 1.

Referring now to FIG. 1, there is shown a side elevational view of the novel, adjustable vacuum regulator valve generally indicated as 10. Vacuum regulator 10 comprises a valve body 12, having an inlet port 14 and an outlet port 16, both of which are internally screw threaded. Referring to FIGS. 2 and 3, it can be seen that upper portion 18 of valve body 12 is circular in cross sectional area, and open at the annular top 20 of valve body. Upper portion 18 of valve body 12 defines an interior circular chamber 22 having an annular lip 24 and internal screw threads 26 extending upwardly from annular lip 24 to annular top 20. A valve cap 26 having externally screw threads, is designed to cooperate with the internal screw threads of upper portion 18 of valve body 12 in order to seal chamber 22. Valve cap 26, has a vent passageway 28 for communication between interior chamber 22 and the atmosphere.

Middle valve portion 30, which contains inlet port 14 and outlet port 16, also contains a vertical, longitudinal passageway 32. Vertical longitudinal passageway 32 is for receipt of an adjustable needle-nose stem valve 34. Vertical longitudinal passageway 32 is internally screw threaded proximate to its communication with interior chamber 22. Vertical, longitudinal passageway 32 has a greater cross sectional area proximate to lower valve portion 36 of valve body 12. This larger cross sectional area is internally screw threaded for receipt of a lock nut as which will be more fully explained hereafter.

Referring now to adjustable needle-nose stem valve 34, it is substantially circular in cross sectional area having an upper end 38 which is conically truncated in shape and a lower end 40 which has a rectangular indent 42 for adjustment of the needle-nose stem valve by use of a tool such as a screwdriver or Phillips wrench.

Adjustable needle-nose stem valve 34 has external screw threads 44 proximate to upper truncated conical end 38 for cooperation with the internal screw threads of longitudinal passageway 32. Adjustable needle-nose stem valve 34 also has an annular indent 46 below external screw threads 44 for receipt of an O ring 48 as will be more fully described hereafter.

Adjustable needle-nose stem valve 34 contains a T-shaped passageway comprising a vertical, longitudinal passageway 49 extending downwardly from truncated conical section 38 to a horizontal passageway 50 positioned approximately midway along the length of adjustable needle-nose stem valve 34. The cross sectional area of horizontal passageway 50 increases at the circumference of adjustable needle-nose stem valve 34 to provide for a circumferential annular indent 52 on the surface of adjustable needle-nose stem valve 34. Circumferential annular indent 52 is for cooperation with inlet port 14 and passageway 54 which is in communication with inlet port 14 and horizontal passageway 50 in adjustable needle-nose stem valve 34.

A second annular indent 56 is located on adjustable needle-nose stem valve 34 below circumferential annular indent 52 for receipt of a second O ring 60.

Lower portion 40, of adjustable needle-nose stem valve 34, is substantially circular in cross sectional area and designed to permit a lock nut 62 having external screw threads 64 to slip over the lower portion 40 of adjustable needle-nose stem valve 34 and cooperate with the internal screw threads of lower portion 36 of valve body 12. A third O ring 66 cooperates with lock nut 62, lower valve body 36 and adjustable needle-nose stem valve 34 to effectuate a seal.

Outlet port 16 has a passageway 68 in communication with outlet port 16 and chamber 22 of valve body 12.

There is positioned within chamber 22 of valve body 12, a flexible diaphragm 70 which seats on its circumferential edge 72 on annular lip 24 and is positioned by valve cap 26 when valve cap 26 is threadedly secured to upper valve body 18.

When lock nut 62 is not securely engaged with lower valve body 36, it can be seen that adjustable needle-nose stem valve 34 may be adjusted upwardly or downwardly by means of external screw threads 44 in cooperation with the internal screw threads of valve body 12. Circumferential annular indent 52 on adjustable needle-nose stem valve 34 is of a greater diameter than horizontal passageway 50 so as to permit communication between inlet port 14 and vertical longitudinal passageway 48 as adjustable needle-nose stem valve 34 is moved upwardly or downwardly. The positioning of adjustable needle-nose stem valve 34 may be secured by lock nut 62.

In operation, lock nut 62 is released to permit the adjustment of adjustable needle-nose stem valve 34. The vacuum is drawn from the inlet port 14 side of valve 10 and adjustable needle-nose stem valve 34 is moved upwardly or downwardly to obtain the desired vacuum reading or pressure reading as measured by a gauge on the outlet port 16 side of valve 10. Adjustable needle-nose stem valve 34's contact with flexible diaphragm 70 maintains the aforesaid pressure reading and lock nut 62 may then be secured in order to maintain the aforementioned pressure or vacuum reading. Adjustments in the pressure or vacuum reading are made in a similar manner by rotating adjustable needle-nose stem valve 34 upwardly or downwardly.

Passageway 28 in cap 26 provides a vent to the atmosphere for that portion of chamber 22 located above flexible diaphragm 70. Diaphragm 70 is made of many suitable materials having flexible nonporous characteristics.

It will be recognized by those skilled in the art, that while the invention has been described in connection with the exemplary embodiment thereof, it will be understood that many modifications will be apparent to those of ordinary skill in the art and that this application is intended to cover any adaptations or variations thereof. Therefore, it is manifestly intended that this invention be only limited by the claims and the equivalents thereof.

I claim:

1. An adjustable vacuum regulator valve comprising a valve body having an inlet port and outlet port;
    a removably secured threaded cap for said valve body cooperting with said valve body in defining a chamber within said valve body, said removably secured cap of said valve body containing an atmospheric vent passageway;
    a flexible diaphragm secured within said chamber defined by said valve body and said removably secured cap;
    an adjustable needle-nose stem valve vertically movable, longitudially disposed within said valve body having a vertical longitudinal passageway therethrough for communication between said inlet port and said chamber, said adjustable needle-nose stem valve having a circumferential annular indent in coopertion with said vertical lonitudinal passageway in said adjustable needle-nose valve to permit said longitudinal vertical passageway to be in communication with said inlet port when said adjustable needle-nose stem valve is rotatably positioned upwardly or downwardly within said valve body, said adjustable needle-nose stem valve cooperating with said flexible diaphragm to set vacuum;
    means for securing said adjustable needle-nose stem valve comprising a lock nut secured to said adjustable needle-nose stem valve and cooperating with said valve body to secure said adjustable needle-nose stem valve in the desired position;
    means for communication between said chamber and said outlet port said means for communication comprising a passageway of said valve body.

* * * * *